United States Patent

Simmsgeiger

[11] Patent Number: 5,961,839
[45] Date of Patent: Oct. 5, 1999

[54] METHOD FOR CLEARING ORNAMENTAL BODIES OF WATER

[76] Inventor: Patrick A. Simmsgeiger, 29641 Via Cebolla, Laguna Niguel, Calif. 92677

[21] Appl. No.: 09/019,753

[22] Filed: Feb. 6, 1998

Related U.S. Application Data

[60] Provisional application No. 60/037,472, Feb. 7, 1997.

[51] Int. Cl.⁶ .................................................. C02F 1/54
[52] U.S. Cl. .................................... 210/728; 210/734
[58] Field of Search ............................. 210/723, 728, 210/729, 732, 733, 734, 735

[56] References Cited

U.S. PATENT DOCUMENTS

| | | | |
|---|---|---|---|
| 3,637,491 | 1/1972 | Hedrick et al. | 210/734 |
| 3,931,122 | 1/1976 | Isaoka et al. | 210/734 |
| 5,393,436 | 2/1995 | Nagan | 210/734 |
| 5,529,700 | 6/1996 | Kierzkowski et al. | 252/180 |
| 5,830,388 | 11/1998 | Kigel et al. | 210/728 |

*Primary Examiner*—Jay H. Woo
*Assistant Examiner*—Betsey J. Morrison
*Attorney, Agent, or Firm*—Knobbe, Martens, Olson & Bear LLP

[57] ABSTRACT

A method for clearing water in ornamental lakes, ponds, streams and other bodies of water comprises the steps: identifying the amount of water to be treated; determining the amount of a polyacrylamide flocculant to be applied necessary to obtain a desired clarity; determining flow rate of the water to be circulated; and applying the polyacrylamide flocculant to the water; wherein the polyacrylamide flocculant has a positive charge density in the range from about 40% to 100% and an average molecular weight in the range from about 6,000,000, to 18,000,000.

9 Claims, No Drawings

METHOD FOR CLEARING ORNAMENTAL BODIES OF WATER

CROSS-REFERENCE TO RELATED APPLICATION

This application claims the benefit of U.S. Provisional Application Ser. No. 60/037472, filed Feb. 7, 1997.

FIELD OF THE INVENTION

The present invention relates to a method for clearing a body of water for ornamental purposes, more particularly to a method for clearing water in ornamental lakes, streams and ponds, as well as fishing ponds, industrial ponds and fire ponds to clear off small particulates which are difficult to settle and which affect adversely the appearance of the body of water. The method of the present invention comprises the use of an emulsion based polyacrylamide flocculant.

BACKGROUND OF THE INVENTION

A clear and clean appearance is very important to an ornamental body of water such as pools, lakes, streams and ponds. In the lake and pond management field, algae, weeds and water clarity have always been a major problem affecting the looking of an ornamental body of water. In order to deal with the problem of algae and weeds contamination, various algaecides and aquatic herbicides have been developed which can effectively control the growth of algae and weeds. Those agents function differently. For example, some of them work through obstruction of the algae cell membrane, blocking further nutrient digestion and causing the algae to starve and die. Some of them contain special UV protectants which block sun rays that algae and weeds need for growth, thus slow or prevent the growth of algae and weeds. As of late, algae and weeds have been controllable with the use of special products.

But water clarity has been an unsolved problem. The clarity problem of water is caused mainly by two sources. One of them is chemical and microbiological contaminations which gives the water unpleasant color, odor, and unclear looking. This source of unclarity is readily dealt with by proper control of water chemistry such as pH level and oxidant concentration. The normally used oxidants for this disinfection purpose include chlorine, bromine and ozone. The other source causing water clarity problem is a physical one, i.e. small particulate matter which scatters lights and generates an unclear looking. So far no effective means is available to control the small particles in a body of water. This particulate matter may consist of either organic matter such as dead algae, weeds, bacteria, or inorganic matter such as clay, sand and silt. Unlike large particles, in many situations the organic and inorganic matter in a body of water is too light and has a too small dimension to settle to the bottom in a reasonable time. Different procedures have been tried to address this problem including the use of mechanical devices, natural flora and chemical treatment. All of which were either ineffective, short lived or inconsistent. For example, circulating devices such as fountains, aerators, bubblers and waterfalls have been used to clean water. As useful tools, these devices have been successfully used to prevent stagnation and play a significant role in keeping a body of water healthy. However, circulation only covers one facet of the total spectrum in water quality management and does not remove suspended particulate matter. Certain types of natural flora (aquatic plants) have been used to clean water by acting as a canopy to prevent sunlight and to absorb nutrients that algae need to survive. The problem is, however, that approximately two thirds of the water surface must be covered to be effective. Furthermore, during peak season certain species of plants grow rapidly (as much as one foot per day) and can overrun a system creating adverse effects and pollution. Besides, in some states certain plants are illegal. As to chemical treatment, flocculants such as aluminum sulfate have been used to clear water, but they are either inconsistent and ineffective or leave behind unwanted materials. For example, aluminum sulfate (Alum) may only drop certain particles depending upon particle size, charge and density. Furthermore, if the water is stirred up, previously treated particles will not re-settle thus necessitating further treatment.

Therefore, there is need for an efficient and simple method to clean a body of ornamental water.

SUMMARY OF THE INVENTION

One aspect of the present invention relates to a composition for clearing of ornamental lakes, streams and ponds, as well as fishing ponds, industrial ponds and fire ponds. The composition includes a polyacrylamide resin with a charge density within the range from about 40% to 100%, preferably from about 70% to 90%, more preferably from 75%–85%, and still more preferably 80%. Molecular weight requirements range from about 6,000,000 to 18,000,000, preferably from 10,000,000 to 17,000,000, more preferably from 14,000,000 to 16,000,000. In one preferred embodiment of the present invention the molecular weight is 15,000,000. The composition can also include surfactants and other ingredients. The composition is preferably provided as an emulsion, such as in light mineral oil.

Another aspect of the invention relates to methods of clearing bodies of water, such as ornamental lakes, streams and ponds, as well as fishing ponds, industrial ponds and fire ponds. This method includes circulating the above-described composition through the body of water.

According to the present invention, a method for cleaning a body of ornamental water using a flocculant is provided. The method comprises the steps of: identifying the amount of water to be treated in the body of ornamental water; determining the amount of the flocculant to be applied necessary to obtain a desired clarity; applying the flocculant to the water; and circulating the water through the body of ornamental water while applying the flocculant, wherein the flocculant comprises polyacrylamide polymer having a positive charge density in the range from about 40% to 100% and an average molecular weight in the range from about 6,000,000, to 18,000,000.

After many unsuccessful experiments, the applicant found that polyacrylamide flocculants can be used to solve the particulate-caused problem in water clarity. Polyacrylamide is a class of well known polymer. Series dry and emulsion polyacrylamide-based organic flocculants are commercially available in a range of ionic charges and molecular weight. It has been reported that a high-charge cationic dry polyacrylamide being dustfree and highly shear resistant has been used in chemical, pharmaceutical, industrial and municipal sludge-treatment operations to produce drier sludge cakes and give a higher settling rate in clarification than other flocculants. Polyacrylamide flocculants are also used in salted soil protection, which keep soil colloids in flocculated condition and prevent soil colloidal dispersion, such dispersion reduces water infiltration in the soil.

The present invention has several significant advantages. By using the method a body of water in an ornamental area can be cleared and cleaned efficiently and quickly, so that the beauty of the ornamental water is restored. Commercially available polyacrylamide is nontoxic, thus, the use of polyacrylamide as flocculant is environmentally safe.

DETAILED DESCRIPTION OF THE INVENTION

According to the present invention, the method for clearing water comprises a step of applying a cationic polyacrylamide dispersion agent (flocculant) to a body of water to flocculate and settle small particulates which otherwise are difficult to settle. It has been found in the invention that the polyacrylamide flocculant can flocculate small particles together very effectively and promote the settlement of those particles significantly.

The polyacrylamide flocculant according to the present invention (marketed by the Applicant under the name "Formula F-20 Enviro-Clear") is a high solid cationic polyelectrolite emulsion based flocculant. The emulsion based polyacrylamide material is commercially available (from Monsanto) and generally manufactured as follows: Starting material (base sodium acrylate monomer) is added to a reactor vessel. This is reacted with specific ratios of DMAEM (dimethylamine ethyl methacrylate) for a specified period of time, pressure, and temperature to accomplish the desired molecular weight, charge density and charge type. At the end of the reaction, a surfactant, such as Lux™ dishwashing liquid, is added to the reactor to emulsify water into the oil phase. Then, an oil carrier (light mineral oil) is added to the reactor and mixed to form the final products.

For the application of the present invention, the cationic polyacrylamide purchased from Monsanto is in emulsion form. The size of the emulsion colloids of polyacrylamide is about 0.5 micron being suspended in light mineral oil. Long chain molecules of the polyacrylamide are confined in those emulsion colloids in a highly coiled form. The content of the emulsion colloids in the emulsion can vary. In one embodiment, the content of the emulsion colloids is about 60% w/w. It has been found that molecular weight and charge density are the two key factors affecting the clearing results. If molecular weight is too low, particles flocculated by the polyacrylamide flocculant will be not large enough and will drop too slow. The flocculant with low molecular weight will not hold small particulates as tight and thus adversely affects clearing results. If the molecular weight is too high, solubility of the flocculant polymer will decrease and the polymer chains do not fully expand when applied to water. A low charge density is not enough to attract small particulates, but if charge density is too high, it will not work well either. According to the present invention, possible charge density of the polyacrylamide ranges from about 40% to 100%, preferably from about 70% to 90%, more preferably from 75%–85%. Although polyacrylamides within a wide range of molecular weight can be used, preferred molecular weight ranges from about 6,000,000 to 18,000,000, more preferably from 10,000,000 to 17,000,000, most preferably from 14,000,000 to 16,000,000. In one preferred embodiment of the present invention the charge density and the molecular weight of the polyacrylamide flocculant are about 80% and 15,000,000, respectively.

The polyacrylamide flocculant of the present invention works by combining small suspended particulate matter (which clouds a body of water and affects clarity) together forming larger, heavier particles which then sink to the bottom by gravity. This particulate matter may consist of either organic matter such as dead algae, weeds, bacteria, or inorganic matter such as clay, sand and silt. In a given situation, the organic and inorganic matter may be too light to settle to the bottom in a reasonable amount of time. By combining and tightening these particles together to form larger particles, density and weight are increased, thus allowing gravity to pull the mass to the bottom.

The working principles are simple for the present flocculant. The polyacrylamide flocculant of the present invention is a specially designed polyelectrolite that works off an ionic charge. The majority of the suspended particles in a body of water are anionic (negatively charged). The polyacrylamide flocculant is cationic (positively charged). When applied, the polyacrylamide emulsion is thoroughly mixed with water and positively charged long molecular chains of the polyacrylamide quickly uncoil and expand in water. And negatively charged particles are attracted to the dissolved and expanded polymer molecules and to one another rapidly and aggressively, like a magnet, thus forming larger, heavier particles which then settle easily and quickly. Therefore, charge density of the polyacrylamide flocculant is very important which serves as the attracting source for the small particles, the molecular weight of the polymer is also very important because different molecular weight will change the solubility, dispersion, and other physical properties of the polymer which in turn will affect the performance of the flocculant. The polyacrylamide flocculant of the present invention is specially designed to clear water in ornamental lakes, streams, and ponds etc. For effective results, proper amount of the flocculant must be thoroughly mixed throughout the body of water. According to the present invention, the application of the polyacrylamide flocculant usually comprises: (a) identifying the amount of water to be treated; (b) determining the amount of the flocculant necessary to obtain the desired clarity; (c) examining the flow rate of water to be circulated to determine the cycle time of the water body to be treated; (d) applying the flocculant to the system.

In step (a), the amount of water to be treated can be easily determined according to the size of the body or the flow rate for a stream. Once the amount of water is determined, the amount of the polyacrylamide flocculant can be determined accordingly in step (b). The application concentration of the flocculant is determined based on jar test results. The jar test is conducted readily by taking a small amount of water sample with a small container, putting certain amount of the flocculant into the sample, thoroughly mixing the two, settling for a period of time (few minutes), and then measuring the clarity of the treated water. The clarity of the water can be measured by any conventional method such as Secci disk. Clarity ideally is in the range of 24 to 36 inches. The concentration of the flocculant needed for the treatment varies for different situation depending on the quality and particle content of the water and the desired clarity. Typical application concentration of the polyacrylamide emulsion flocculant of the present invention ranges from about 0.1 to 15 ppm, preferably from about 0.5 to 10 ppm, more preferably from about 1 to 5 ppm. In step (c) the flow rate at which the water is circulated is set based on balanced considerations of the amount of water to be treated, the capacity of pump, and the desired cycle time. The application concentration of the polyacrylamide flocculant is set by the flow rate of water and the input rate of the flocculant. Once the water flow rate is set and the application concentration is determined, the input rate of the flocculant can be determined in step (d). The flocculant can be injected directly into the intake line of a water pump which controls the water flow. The injection can be conducted with a chemical feed pump or any other conventional means. The flocculant can also be dripped through an intake strainer of the water pump. After the water circulating operation is finished, i.e. all the water to be treated has been mixed with a predetermined amount or concentration of the flocculant, it usually takes few hours for the water to settle, depending on several factors such as size and geometry of the body, particle content and particle size contained in the water. Then a clear, clean looking water is obtained.

The method of the present invention is fast acting, non-toxic, environmentally friendly, biodegradable, non-sludge forming and gives instant results with long-term effectiveness.

In practice of the present invention, the step of application of the polyacrylamide flocculant can be optionally combined with additional water-cleaning steps. Thus, once the water has been cleared with the polyacrylamide flocculant according to the present invention, an algae control agent such as Formula F-30 Algae Control (formulated by Diversified Waterscapes, Inc.) is applied to the water to prevent a reoccurring algae growth. The applicable concentration of the Formula F-30 Algae Control ranges from about 0.1–20 ppm, preferably from about 1–10 ppm. The Formula F-30 Algae Control can effectively block further nutrient digestion causing the algae to starve and die. It is formulated to treat wide variety of algae (over 30,000 varieties). Following the treatment of Formula F-30 algae Control, is the application of a colorant such as Formula F-40 Enviro-Blue (developed by Diversified Waterspaces, Inc.) in a concentration ranging from about 0.1–20 ppm, preferably about 0.5–10 ppm. Formula F-40 Enviro-Blue acts as a UV protectant which slows the growth of aquatic weeds and algae, and adds a pleasant Caribbean blue so as to enhance the beauty of any body of water.

With the treatment of the polyacrylamide flocculant, Formula F-30 Algae Control and Formula F-40 Enviro-Blue as discussed above, the present invention treats contaminated water in a fast acting, environmentally friendly, non-toxic, economic way with effective, long-lasting results giving the treated water pleasant beautiful looking.

EXAMPLE

In one preferred embodiment of the present invention, a pond contaminated with weeds, algae and other small organic/inorganic particulates has been treated as follows. The pond to be treated contains about 325,000 gallon water with an initial clarity of 2 inches. The water is circulated for treatment at a flow rate of 1300 gallon/min. (GPM) with a water pump. The pump is equipped with an intake strainer for feeding a polyacrylamide flocculant (under trade name F-20 Enviro-Clear formulated by Diversified Waterscapes Inc.) of the present invention into the circulated water. It takes approximately 4 hours to circulate the whole body of the water and 3 gallons of F-20 Enviro-Clear dripped into that strainer for that duration to achieve drinking water clarity. Within 24 hours thereafter, about 3 gallon F-30 Algae Control is applied to control algae and 0.25 gallon of F-40 Enviro-Blue is applied to enhance the beauty and to add UV protection. Those agents are applied with the same pump as in the case of F-20 Enviro-Clear. If weeds are out of control a selected type of aquatic herbicide would then be applied accordingly. The clarity of the water after the treatment reaches to 30 inches, and the water becomes much healthier.

So far, over 200 sites have been treated successfully with the method of the present invention, which covers wide variety of climate, location and water quality. Under all these circumstance, the flocculant of the present invention works extremely well.

The water-cleaning method taught by the present invention can be modified in different ways. For example, the polyacrylamide flocculant can be used in combination with other agents such as colorants, algae control agents, oxidants (chlorine, bromine, and ozone etc.), odor-diminishing agents. Different agents can also be applied in different order. The flocculant and other agents can also be applied directly to the body of water without circulating the water.

What is claimed is:

1. A method for cleaning a body of ornamental water using a flocculant comprising the steps of:

identifying the amount of water to be treated in said body of ornamental water;

determining the amount of the flocculant to be applied necessary to obtain a desired clarity;

applying the flocculant to the water; and circulating the water through said body of ornamental water;

wherein the flocculant comprises polyacrylamide polymer having a positive charge density in the range from about 40% to 100% and an average molecular weight in the range from about 6,000,000, to 18,000,000.

2. The method of claim 1, wherein the polyacrylamide has a positive charge density in the range from about 75% to 85%.

3. The method of claim 1, wherein the polyacrylamide has a positive charge density of about 80%.

4. The method of claim 1, wherein the polyacrylamide has an average molecular weight in the range from about 14,000,000 to 16,000,000.

5. The method of claim 1, wherein the polyacrylamide has an average molecular weight of about 15,000,000.

6. The method of claim 1, wherein the flocculant is applied at such an amount that the concentration of the polyacrylamide is in the range of about 0.1 to 15 ppm.

7. The method of claim 1, further comprising applying an algae control agent in a concentration ranging from about 0.1 to 20 ppm.

8. The method of claim 1, further comprising applying a colorant in a concentration ranging from about 0.1 to 20 ppm.

9. The method of claim 1, wherein the flocculant is an emulsion and the polyacrylamide is present as colloids in the emulsion.

* * * * *